United States Patent
Tsai

(10) Patent No.: US 10,117,135 B2
(45) Date of Patent: Oct. 30, 2018

(54) APPARATUSES AND METHODS FOR REDUCING SETUP TIME OF A CIRCUIT-SWITCHED FALLBACK (CSFB) CALL

(71) Applicant: MediaTek Inc., Hsin-Chu (TW)

(72) Inventor: Chun-Fan Tsai, Houlong Township, Miaoli County (TW)

(73) Assignee: MEDIATEK INC., Hsin-Chu (TW)

( * ) Notice: Subject to any disclaimer, the term of this patent is extended or adjusted under 35 U.S.C. 154(b) by 49 days.

(21) Appl. No.: 14/862,612

(22) Filed: Sep. 23, 2015

(65) Prior Publication Data
US 2017/0086102 A1    Mar. 23, 2017

(51) Int. Cl.
*H04W 36/00*  (2009.01)
*H04W 76/18*  (2018.01)
*H04W 48/16*  (2009.01)

(52) U.S. Cl.
CPC ....... *H04W 36/0022* (2013.01); *H04W 76/18* (2018.02); *H04W 48/16* (2013.01)

(58) Field of Classification Search
CPC ......... H04W 36/0005; H04W 36/0011; H04W 36/0022
See application file for complete search history.

(56) References Cited

U.S. PATENT DOCUMENTS

| 2012/0302239 | A1 | 11/2012 | Hu et al. |
| 2013/0044613 | A1* | 2/2013 | Edara .................. H04W 76/026 370/252 |
| 2014/0293960 | A1 | 10/2014 | Su et al. |
| 2015/0055625 | A1* | 2/2015 | Burbidge .......... H04W 36/0022 370/331 |
| 2015/0350965 | A1* | 12/2015 | Kabadi ............. H04W 36/0022 370/331 |
| 2015/0358862 | A1* | 12/2015 | Devarayanigari .......... H04W 36/0022 370/331 |
| 2016/0007240 | A1* | 1/2016 | Belghoul .......... H04W 36/0022 370/331 |

FOREIGN PATENT DOCUMENTS

| CN | 103607783 | 2/2014 |
| EP | 2 725 848 | 7/2014 |
| WO | WO 2013/147562 | 10/2013 |
| WO | WO 2014/133313 | 9/2014 |

* cited by examiner

Primary Examiner — Feben Haile
(74) Attorney, Agent, or Firm — McClure, Qualey & Rodack, LLP

(57) ABSTRACT

A mobile communication device including a Baseband processor is provided. The Baseband processor is configured to determine whether the mobile communication device is operating in an idle mode or a connected mode with a first service network in response to starting a Circuit Switch Fallback (CSFB) call, search for a cell of a second service network on a frequency, on which the mobile communication device has previously made another CSFB call successfully from the first service network, when the mobile communication device is operating in the idle mode with the serving cell, and make the CSFB call on the cell.

12 Claims, 4 Drawing Sheets

| Source cell ID | Target frequency | CSFB result | CSFB finish time |
|---|---|---|---|
| Cell-ID-0 | UARFCN-0 | Success | Time_A |
| Cell-ID-0 | ARFCN-1 | Failure | Time_B |
| Cell-ID-1 | UARFCN-0 | Success | Time_C |
| Cell-ID-2 | UARFCN-2 | Success | Time_D |
| ... | ... | ... | ... |

FIG. 4

APPARATUSES AND METHODS FOR REDUCING SETUP TIME OF A CIRCUIT-SWITCHED FALLBACK (CSFB) CALL

BACKGROUND OF THE INVENTION

Field of the Invention

The invention generally relates to Circuit Switch Fallback (CSFB) technology, and more particularly, to apparatuses and methods for reducing the setup time of a CSFB call.

Description of the Related Art

With growing demand for ubiquitous computing and networking, various wireless technologies have been developed, such as the Wireless Local Area Network (WLAN) technologies, including the Wireless Fidelity (WiFi) technology, Bluetooth technology, and the Zigbee technology, etc., and also, the cellular technologies, including the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA2000) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, and LTE-Advanced (LTE-A) technology, etc.

For user convenience and flexibility, most User Equipment (UE) nowadays supports more than one wireless technology. Using a UE supporting both of the GSM/GPRS/EDGE/WCDMA technology and the LTE technology as an example, it may selectively obtain wireless services using the GSM/GPRS/EDGE/WCDMA technology or the LTE technology. Generally, it selects an LTE network over a GSM/GPRS/EDGE/WCDMA network when wireless services are available from both the service networks, since the LTE network may be more likely to provide wireless services with higher bandwidth than the GSM/GPRS/EDGE/WCDMA network. Nonetheless, in some cases, a technique called Circuit-Switched Fallback (CSFB) may be employed for a UE which is already camped on an LTE network to switch to the GSM/GPRS/EDGE/WCDMA network for accessing, particularly, Circuit-Switched (CS) services, e.g., a CS call, instead. The CS call made utilizing the CSFB technique is generally referred to as a CSFB call.

However, the setup time of a CSFB call may be too long and cause bad user experience. For example, a UE operating in the LTE idle mode is required to establish a Radio Resource Control (RRC) connection to transmit an EXTENDED SERVICE REQUEST message, so that information of one or more target frequencies may be obtained from the LTE network, which indicates the UE to search for a cell on the target frequencies to make the CSFB call. Yet, there are situations where the RRC connection establishment may be delayed due to bad LTE cell quality, or there are situations where the cells on the target frequencies may not be able to provide fair signal quality for the UE to make the CSFB call successfully.

BRIEF SUMMARY OF THE INVENTION

In order to solve the aforementioned problems, the invention proposes a mobile communication device (i.e., a UE) to keep the histories of all CSFB call attempts and make use of the history information to search for a cell to make the current CSFB call.

In one aspect of the invention, a mobile communication device comprising a Baseband processor is provided. The Baseband processor is configured to determine whether the mobile communication device is operating in an idle mode or a connected mode with a first service network in response to starting a CSFB call, search for a cell of a second service network on a frequency, on which the mobile communication device has previously made another CSFB call successfully from the first service network, when the mobile communication device is operating in the idle mode with the serving cell, and make the CSFB call on the cell.

In another aspect of the invention, a method for reducing setup time of a CSFB call by a mobile communication device is provided. The method comprises the steps of: determining whether the mobile communication device is operating in an idle mode or a connected mode with a serving cell of a first service network in response to starting the CSFB call; searching for a cell of a second service network on a frequency, on which the mobile communication device has previously made another CSFB call successfully from the serving cell, when the mobile communication device is operating in the idle mode with the serving cell; and making the CSFB call on the cell.

Other aspects and features of the present invention will become apparent to those with ordinarily skill in the art upon review of the following descriptions of specific embodiments of the mobile communication devices and the methods for reducing the setup time of a CSFB call.

BRIEF DESCRIPTION OF DRAWINGS

The invention can be more fully understood by reading the subsequent detailed description and examples with references made to the accompanying drawings, wherein:

FIG. 4 is an exemplary diagram illustrating the CSFB learning table according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
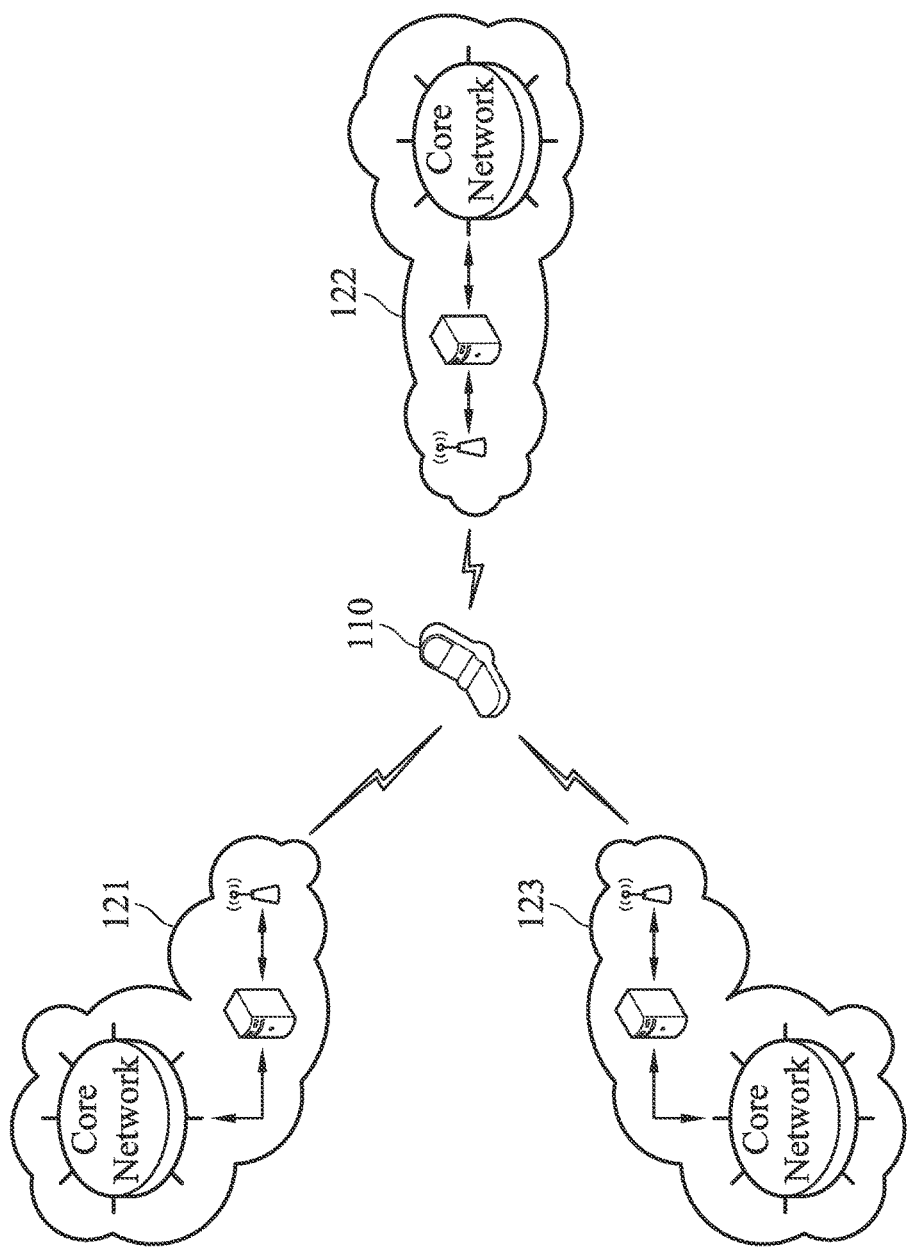
FIG. 1 is a block diagram illustrating a wireless communications environment according to an embodiment of the invention.

FIG. 1 is a block diagram illustrating a wireless communications environment according to an embodiment of the invention. The wireless communications environment 100 comprises a mobile communication device 110 and a plurality of service networks 121~123, wherein each of the service networks 121~123 supports a respective RAT on one or more particular radio frequencies. For example, the service network 121 is a GSM/GPRS/EDGE network, the service network 122 is a WCDMA network, and the service network 123 is an LTE/LTE-A/TD-LTE network.

Specifically, each of the service networks 121~123 may comprise an access network and a core network. Using the service network 121 being a GSM/GPRS/EDGE network as an example, the access network may be a Base Station Subsystem (BSS) which includes at least a Base Transceiver Station (BTS) and a Base Station Controller (BSC), and the core network may be a GPRS core which includes at least a Home Location Register (HLR), at least one Serving GPRS Support Node (SGSN), at least one Gateway GPRS Support Node (GGSN). Using the service network 122 being a WCDMA network as an example, the access network may be a Universal Terrestrial Radio Access Network (UTRAN) which includes at least a Node B and a Radio Network Controller (RNC), and the core network may be a GPRS core. Using the service network 123 being an LTE/LTE-A/TD-LTE network as an example, the access network may be an Evolved-UTRAN (E-UTRAN) which includes at least an evolved NB (eNB), and the core network may be an Evolved Packet Core (EPC) which includes at least a Home Subscriber Server (HSS), Mobility Management Entity (MME), Serving Gateway (S-GW), Packet Data Network Gateway (PDN-GW or P-GW).

The mobile communication device 110 supports a plurality of RATs and radio frequencies, including the RATs and radio frequencies utilized by the service networks 121~123. The mobile communication device 110 may wirelessly communicate with one of the service networks 121~123 for obtaining mobile services, including Circuit-Switched (CS) and/or Packet-Switched (PS) services, wherein the CS services may include voice call services, and Short Message Service (SMS), etc., and the PS services may include Voice over IP (VoIP) service and data services, such as e-mail transmission, web browsing, file upload/download, instant messaging, streaming video, or others. For example, the mobile communication device 110 may be a multi-RAT mobile device, such as a mobile phone, panel PC, or notebook PC, etc. Alternatively, the mobile communication device 110 may be an external data card for a computer host, notebook, or panel PC to obtain mobile services.

Figure 2:
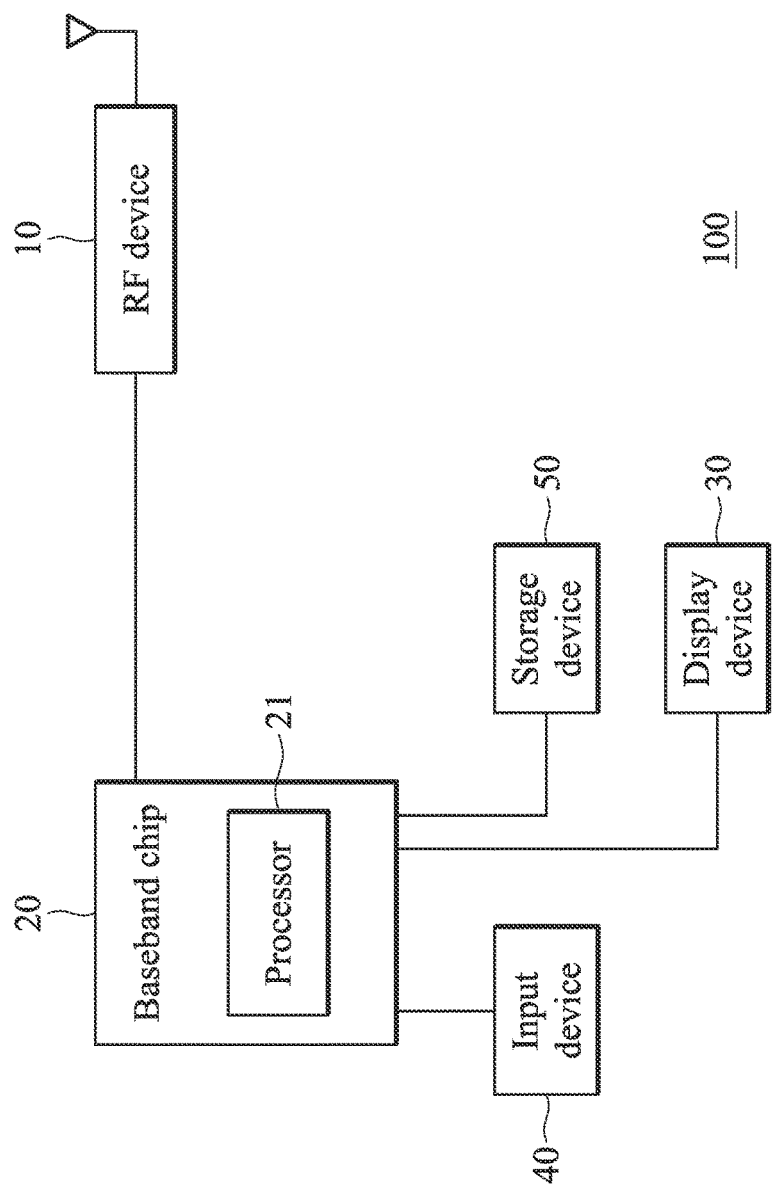
FIG. 2 is a block diagram illustrating the mobile communication device 110 according to an embodiment of the invention.

FIG. 2 is a block diagram illustrating the mobile communication device 110 according to an embodiment of the invention. The mobile communication device 110 comprises a Radio Frequency (RF) device 10, a Baseband chip 20, a display device 30, an input device 40, and a storage device 50, wherein the RF device 10, the display device 30, the input device 40, and the storage device 50 are coupled to the Baseband chip 20. The Baseband chip 20 comprises a processor 21, such as a Micro-Control Unit (MCU), Digital Signal Processor (DSP), or the like, for controlling the RF device 10 for wireless communications, sending a series of frame data (e.g. representing text messages, graphics, images or others) to the display device 30, receiving signals from the input device 40, and storing and retrieving data to and from the storage device 50. Most importantly, the processor 21 coordinates the aforementioned operations of the RF device 10, the display device 30, the input device 40, and the storage device 50 for performing the method for reducing the setup time of a CSFB call.

Additionally, the Baseband chip 20 may further contain other hardware components to perform baseband signal processing, including Analog-to-Digital Conversion (ADC)/Digital-to-Analog Conversion (DAC), gain adjusting, modulation/demodulation, encoding/decoding, and so on. The RF device 10 may receive RF wireless signals via an antenna, convert the received RF wireless signals to baseband signals, which are processed by the Baseband chip 20, or receive baseband signals from the Baseband chip 20 and convert the received baseband signals to RF wireless signals, which are later transmitted via the antenna. The RF device 10 may also contain multiple hardware devices to perform radio frequency conversion. For example, the RF device 10 may comprise a mixer to multiply the baseband signals with a carrier oscillated in the radio frequency of the supported RATs, wherein the radio frequency may be 900 MHz, 1800 MHz or 1900 MHz utilized in GSM/GPRS/EDGE technology, or may be 900 MHz, 1900 MHz or 2100 MHz utilized in WCDMA technology, or may be 900 MHz, 2100 MHz, or 2.6 GHz utilized in LTE/LTE-A/TD-LTE technology, or others, depending on the RAT in use.

The display device 30 may be a Liquid-Crystal Display (LCD), Light-Emitting Diode (LED) display, or Electronic Paper Display (EPD), etc., for providing a display function. Alternatively, the display device 30 may further comprise one or more touch sensors disposed thereon or thereunder for sensing touches, contacts, or approximations of objects, such as fingers or styluses.

The input device 40 may comprise one or more buttons, a keyboard, a mouse, a touch pad, a video camera, a microphone, and/or a speaker, etc., serving as the Man-Machine Interface (MMI) for interaction with users.

The storage device 50 may be a memory, such as a FLASH memory or a Non-volatile Random Access Memory (NVRAM), or a magnetic storage device, such as a hard disk or a magnetic tape, or an optical disc, or any combination thereof for storing communication data for the Baseband chip 20, wherein the communication data includes a CSFB learning table used to store the frequencies on which the mobile communication device 110 has made CSFB calls.

It should be understood that the components described in the embodiment of FIG. 2 are for illustrative purposes only and are not intended to limit the scope of the invention.

Figure 3:
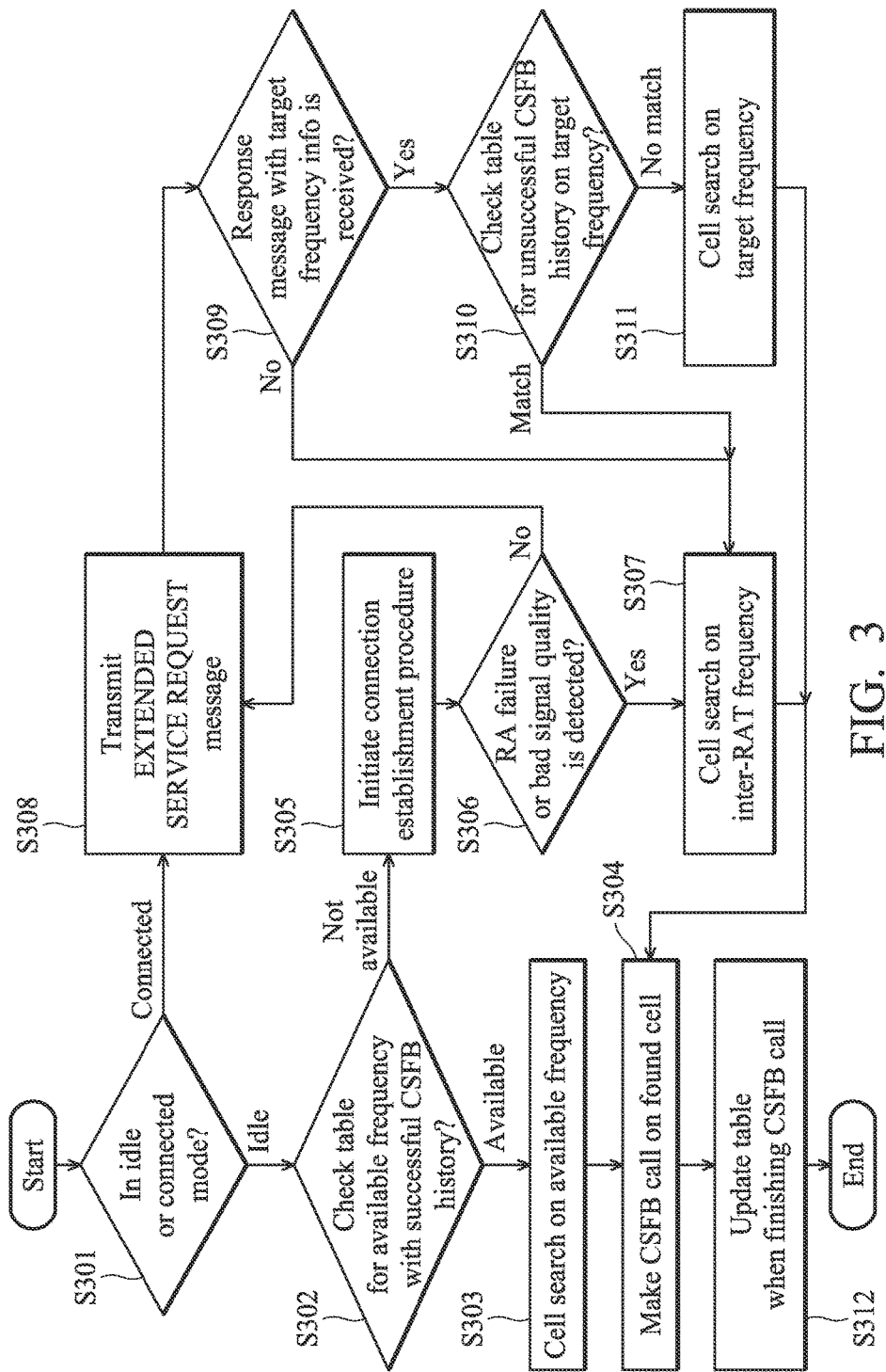
FIG. 3 is a flow chart illustrating the method for reducing the setup time of a CSFB call by a mobile communication device according to an embodiment of the invention.

FIG. 3 is a flow chart illustrating the method for reducing the setup time of a CSFB call by a mobile communication device according to an embodiment of the invention. In this embodiment, the method may be applied to the mobile communication device 110. To begin, the mobile communication device determines whether it is operating in the idle mode or connected mode with the serving cell of a first service network in response to starting a CSFB call (step S301). In one embodiment, each of the idle mode and connected mode may refer to a respective operation state specified for the Radio Resource Control (RRC) layer of the communication protocol in use between the mobile communication device and the first service network. For example, the idle mode may be the RRC_IDLE state, and the connected mode may be the RRC_CONNECTED state.

Subsequent to step S301, if the mobile communication device is operating in the idle mode with the serving cell of the first service network, the mobile communication device checks the CSFB learning table to see if there's a stored item for a frequency on which the mobile communication device has previously made another CSFB call successfully from the same serving cell (step S302). If such an item is found in the CSFB learning table, the mobile communication device searches for a cell of a second service network on that frequency (step S303), and then makes the CSFB call on the found cell (step S304).

Subsequent to step S302, if there's no such item in the CSFB learning table, the mobile communication device initiates an RRC connection establishment procedure with the serving cell of the first service network (step S305). Next, the mobile communication device determines whether a Random Access (RA) failure or a signal quality of the serving cell dropping below a predetermined threshold is detected during the RRC connection establishment procedure (step S306), and if so, it searches for a cell on any inter-RAT frequency (i.e., the frequencies used by another RAT, a.k.a., another service network) (step S307). Otherwise, if no RA failure is detected or the signal quality of the serving cell remains greater than or equal to the predetermined threshold during the RRC connection establishment procedure, the mobile communication device transmits an EXTENDED SERVICE REQUEST message to the first service network via the serving cell when the RRC connection is established (step S308).

Subsequent to step S308, the mobile communication device determines whether a response message corresponding to the EXTENDED SERVICE REQUEST message is received from the first service network via the serving cell, wherein the response message comprises information of a target frequency (step S309). In one embodiment, the response message may be an RRC CONNECTION RELEASE message comprising redirection information (i.e., the information of the target frequency). In another embodiment, the response message may be an RRC CONNECTION RECONFIGURATION message comprising mobility control information (i.e., the information of the target frequency).

Subsequent to step S309, if such a response message is received, the mobile communication device checks the CSFB learning table to see if there's a stored item indicating that the mobile communication device has previously made another CSFB call unsuccessfully from the serving cell on the target frequency (step S310). If such an item is found in the CSFB learning table, the method continues to step S307 where the mobile communication device searches for a cell on any inter-RAT frequency. Otherwise, if there's no such item in the CSFB learning table, the mobile communication device searches for a cell on the target frequency (step S311).

Subsequent to step S309, if no response message is received or a response message is received without the target frequency information, the method continues to step S307 where the mobile communication device searches for a cell on any inter-RAT frequency.

Please note that steps S307 and S311 proceeds to step S304 where the mobile communication device makes the CSFB call on the searched cell. Subsequent to step S304, the mobile communication device updates the CSFB learning table when the CSFB call is finished (step S312), and the method ends.

Advantageously, unlike conventional UEs, the mobile communication device in the idle mode can skip the RRC connection establishment procedure for transmitting the EXTENDED SERVICE REQUEST message and skip the waiting of the target frequency information from the network side. Also, the mobile communication device can perform the inter-RAT cell search as early as possible when detecting a RA failure or bad signal quality of the serving cell during the RRC connection establishment procedure or when the target frequency information received from the network side is likely to be inappropriate according to the CSFB learning table.

FIG. 4 is an exemplary diagram illustrating the CSFB learning table according to an embodiment of the invention. As shown in FIG. 4, each stored item has four attributes. The first attribute is the cell identification (ID) (denoted as "cell-ID-0", "cell-ID-1", or "cell-ID-2") of the serving cell when acknowledging the start of a CSFB call. The second attribute is the information of the target frequency (denoted as "UARFCN-0", "ARFCN-1", "UARFCN-0", or "UARFCN-2"), wherein UARFCN is the abbreviation of UTRA Absolute Radio Frequency Channel Number. The third attribute is the result (denoted as "Success" or "Failure") of the corresponding CSFB call. The fourth attribute is the finish time (denoted as "Time_A", "Time_B", "Time_C", or "Time_D") of the corresponding CSFB call.

Please note that the CSFB learning table may be periodically updated to remove the stored item which was added to the CSFB learning table at a time elapsing over a predetermined period of time. Alternatively, the periodic update of the CSFB learning table may be performed each time at the start of a CSFB call.

While the invention has been described by way of example and in terms of preferred embodiment, it is to be understood that the invention is not limited thereto. Those who are skilled in this technology can still make various alterations and modifications without departing from the scope and spirit of this invention. For example, the method of FIGS. 3A and 3B may be implemented in program code stored in a machine-readable storage medium, such as a magnetic tape, semiconductor, magnetic disk, optical disc (e.g., CD-ROM, DVD-ROM, etc.), or others, which is loaded and executed by the Baseband processor of a mobile communication device. Therefore, the scope of the present invention shall be defined and protected by the following claims and their equivalents.

What is claimed is:

1. A mobile communication device, comprising:
a storage device configured to store history information of previously made CSFB calls by the mobile communication device; and
a Baseband processor configured to perform the following in response to starting a new Circuit Switch Fallback (CSFB) call:
determining whether the mobile communication device is operating in an idle mode or a connected mode with a serving cell of a first service network;
determining whether the history information comprises a frequency on which one of the previously made CSFB calls was made successfully from the first service network when the mobile communication device is operating in the idle mode with the serving cell;
when the history information comprises such a frequency, searching for a cell of a second service network on the frequency and making the new CSFB call on the cell; and
when the history information does not comprise such a frequency, initiating a connection establishment procedure with the serving cell, searching for another cell on any inter-Radio Access Technology (inter-RAT) frequency when detecting a Random Access (RA) failure or a signal quality of the serving cell dropping below a predetermined threshold during the connection establishment procedure, and making the new CSFB call on the other cell.

2. The mobile communication device of claim 1, wherein the Baseband processor is further configured to update the history information in response to finishing the new CSFB call, and periodically remove the stored frequency from the history information, which was added to the history information over a predetermined period of time.

3. The mobile communication device of claim 1, wherein the first service network provides only Packet-Switched (PS) services, and the second service network provides Circuit-Switched (CS) services.

4. A method for reducing setup time of a Circuit Switch Fallback (CSFB) call by a mobile communication device, comprising:
  keeping history information of previously made CSFB calls; and
  performing the following in response to starting a new CSFB call:
  determining whether the mobile communication device is operating in an idle mode or a connected mode with a serving cell of a first service network;
  determining whether the history information comprises a frequency on which one of the previously made CSFB calls was made successfully from the serving cell when the mobile communication device is operating in the idle mode with the serving cell;
  when the history information comprises such a frequency, searching for a cell of a second service network on the frequency and making the new CSFB call on the cell; and
  when the history information does not comprise such a frequency, initiating a connection establishment procedure with the serving cell, searching for another cell on any inter-Radio Access Technology (inter-RAT) frequency when detecting a Random Access (RA) failure or a signal quality of the serving cell dropping below a predetermined threshold during the connection establishment procedure, and making the new CSFB call on the other cell.

5. The method of claim 4, further comprising:
  updating the history information in response to finishing the CSFB call; and
  periodically removing the stored frequency from the history information, which was added to the history information over a predetermined period of time.

6. The method of claim 4, wherein the first service network provides only Packet-Switched (PS) services, and the second service network provides Circuit-Switched (CS) services.

7. A mobile communication device, comprising:
  a storage device configured to store history information of previously made CSFB calls by the mobile communication device; and
  a Baseband processor configured to perform the following in response to starting a new Circuit Switch Fallback (CSFB) call:
  determining whether the mobile communication device is operating in an idle mode or a connected mode with a serving cell of a first service network;
  determining whether the history information comprises a frequency on which one of the previously made CSFB calls was made successfully from the first service network when the mobile communication device is operating in the idle mode with the serving cell;
  when the history information comprises such a frequency, searching for a first cell of a second service network on the frequency and making the new CSFB call on the first cell;
  receiving information of a target frequency from the first service network via the serving cell in response to transmitting an EXTENDED SERVICE REQUEST message to the first service network via the serving cell when the mobile communication device is operating in the connected mode with the serving cell; and
  searching for a second cell on any inter-RAT frequency and making the new CSFB call on the second cell, in response to the history information comprising the target frequency on which one of the previously made CSFB calls was made unsuccessfully from the serving cell.

8. The mobile communication device of claim 7, wherein the Baseband processor is further configured to update the history information in response to finishing the new CSFB call, and periodically remove the stored frequency from the history information, which was added to the history information over a predetermined period of time.

9. The mobile communication device of claim 7, wherein the first service network provides only Packet-Switched (PS) services, and the second service network provides Circuit-Switched (CS) services.

10. A method for reducing setup time of a Circuit Switch Fallback (CSFB) call by a mobile communication device, comprising:
  keeping history information of previously made CSFB calls; and
  performing the following in response to starting a new CSFB call:
  determining whether the mobile communication device is operating in an idle mode or a connected mode with a serving cell of a first service network;
  determining whether the history information comprises a frequency on which one of the previously made CSFB calls was made successfully from the serving cell when the mobile communication device is operating in the idle mode with the serving cell;
  when the history information comprises such a frequency, searching for a first cell of a second service network on the frequency and making the new CSFB call on the first cell;
  receiving information of a target frequency from the first service network via the serving cell in response to transmitting an EXTENDED SERVICE REQUEST message to the first service network via the serving cell when the mobile communication device is operating in the connected mode with the serving cell; and
  searching for a second cell on any inter-RAT frequency and making the new CSFB call on the second cell, in response to the history information comprising the target frequency on which one of the previously made CSFB call was made unsuccessfully from the serving cell.

11. The method of claim 10, further comprising:
  updating the history information in response to finishing the CSFB call; and
  periodically removing the stored frequency from the history information, which was added to the history information over a predetermined period of time.

12. The method of claim 10, wherein the first service network provides only Packet-Switched (PS) services, and the second service network provides Circuit-Switched (CS) services.

* * * * *